United States Patent Office 2,783,063
Patented Feb. 26, 1957

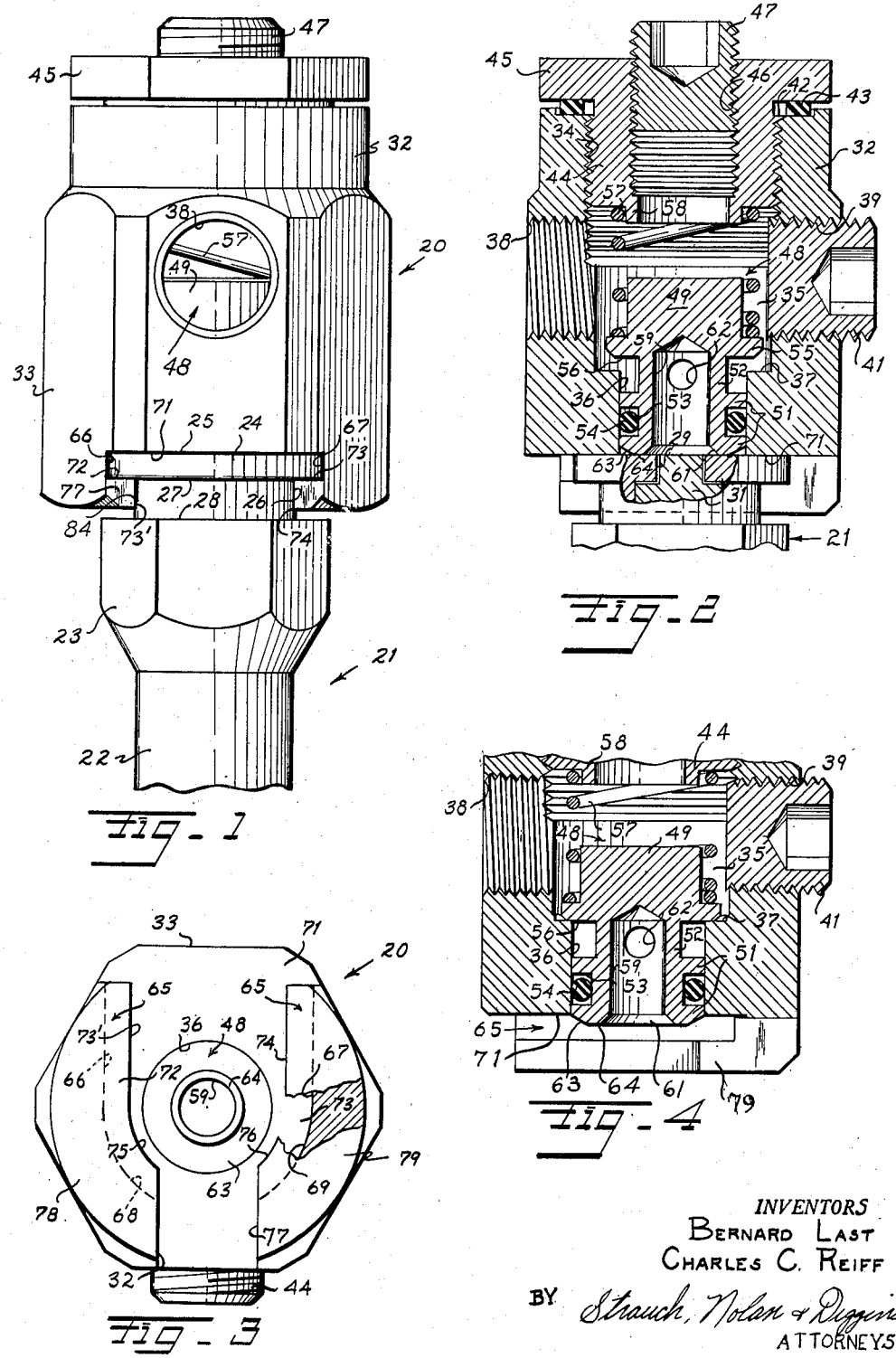

2,783,063

COUPLING

Bernard Last, Pittsburgh, Pa., and Charles C. Reiff, Bellefontaine, Ohio, assignors to Rockwell Manufacturing Company, Pittsburgh, Pa., a corporation of Pennsylvania Application September 3, 1953, Serial No. 378,382

2 Claims. (Cl. 284—17)

This invention relates to couplings and more particularly to improved coupling structure for connecting a source of lubricant under pressure to a fitting on a device to be charged with the lubricant.

It has constantly been the effort of those skilled in this art to provide a mechanically simple means for coupling a source of lubricant such as a grease gun, pump, or the like to a lubricant admission fitting which will permit easy connection and disconnection of the coupling and fitting, will assure efficient delivery of the lubricant to the fitting without loss of the lubricant during the charging operation, and will prevent the loss of further flow of lubricant from the source of lubricant once the fitting and coupling are disconnected.

The present invention embodies certain improved details of construction and operation which assure attainment of the foregoing described desirable features with a coupling that is structurally simple but strong, compact, relatively inexpensive, and easily adaptable to known lubricant fittings.

In its preferred embodiment the coupling of the invention will be described by way of example as applied to a button head lubricant fitting which is a well known standard type today, but this is not to be considered restrictive of the scope of the invention defined in the claims.

The primary object of this invention is to provide a normally closed coupling of novel construction which is automatically opened upon attachment to a device to be lubricated.

It is a further object of the invention to provide a novel coupling having a special fluid tight socket capable of easy connection and disconnection with a conventional lubricant fitting.

Still another object of the invention is to provide a coupling with an improved check valve which assures efficient loss-free delivery of lubricant to a fitting.

Yet another object of this invention is to provide a coupling having an improved check valve automatically opened upon connection of the coupling to a lubricant fitting and automatically tightly closed upon disconnection from the lubricant fitting.

These and other objects will become apparent from the following description and appended claims when read in connection with the attached drawing, wherein:

Figure 1 is a front elevation of a coupling according to a preferred embodiment of the invention shown connected to a button type lubricant fitting;

Figure 2 is a vertical section through the coupling assembly of Figure 1 with the valve open;

Figure 3 is a bottom plan view of the coupling of Figure 1 with the lubricant fitting removed; and Figure 4 is a fragmentary view in section showing the check valve closed.

The improved coupling 20 of the invention is shown attached to a lubricant screw 21 of the type used in lubricated plug valve assemblies and disclosed in Serial No. 371,884 filed August 3, 1953.

Screw 21 comprises a shank 22 adapted to be threaded into the valve (not shown), a non-circular wrench receiving portion 23, and a button head having a circular flange 24 terminating in a flat end face 25 and an annular groove having a cylindrical bottom wall 26 and parallel flat sides 27 and 28. Flange 24 is formed with a central opening 29 leading internally of the fitting, which opening is normally closed by a spring biased plug 31.

Coupling 20 comprises a hollow housing 32 having a non-circular exterior surface 33 for the reception of a wrench or like tool for assembling the coupling to the end of a conduit from a grease gun, pump, or other source of lubricant. An internally threaded bore 34 opens from one end of housing 32 and terminates in an internal chamber 35. A smaller diameter smooth cylindrical bore 36 coaxial with bore 34 opens inwardly from the opposite end of housing 32 and into chamber 35 where it is surrounded by a smooth flat annular surface 37 perpendicular to the axis of bore 36 which surface serves as a valve seat as will appear.

Opposed transverse threaded bores 38 and 39 of the same size whose common axis is perpendicular to the common axis of bores 34 and 36 extend through the side walls of housing 32 into chamber 35. Bore 38 is open for attachment of a suitable lubricant conduit fitting (not shown) while bore 39 is closed by a threaded plug 41.

The end of housing 32 adjacent threaded bore 34 is counterbored as at 42 to receive resilient seal washer 43, and a cap 44 is threaded into bore 34 and provided with a flange 45 adapted to compress washer 43 against the housing. Cap 44 is provided with axially extending threaded bore 46 of the same diameter as bores 38 and 39, and which is closed by threaded plug 47. Bores 38, 39 and 46 provide a plurality of optional inlets to chamber 35 to which a grease gun or pump can be secured to coupling 20 and, as illustrated in Figure 2, the two bores not being used are closed by standard pipe plugs 41 or 47 which are the same size and fit any of these bores.

The check valve element is indicated at 48 and comprises a solid body 49 connected with a cylindrical boss 51 by a cylindrical neck 52 of appreciably smaller diameter than bore 36. Boss 51 is slidable axially in bore 36 and is formed with an annular groove 53 containing a compressed rubber O-ring seal 54 that prevents undesired leakage of lubricant from chamber 35 along the wall of bore 36.

At its lower end body 49 has a radial flange 55 formed on its bottom to provide a smooth flat annular face 56 which evenly contacts valve seal face 37 when the valve is closed. A coil spring 57 is compressed between a pilot boss 58 on the lower end of cap 44 and the flange 55 so that valve element 48 is constantly urged toward seat 37.

Valve element 48 is formed with an internal bore 59 which opens outwardly through a flared mouth 61 at the end of boss 52. The inner end of bore 59, above boss 52, connects with diametrically opposite side ports 62 which extend through neck 51 of the valve element. When the valve element 48 is in the open position of Figure 2, bore 59 connects through ports 62 to chamber 35. When the valve element 48 is closed with faces 56 and 37 in contact, ports 62 are cut off from chamber 35 because ports 62 are well below the level of face 56.

The lower end of boss 52 is externally chamfered at 63 to provide a conical cam face surrounding the lower end of bore 59 and narrow flat smooth annular face 64 which is perpendicular to the bore axis.

The lower end of housing 32 is formed with a socket structure for slip fit with the button head of fitting 21. This socket comprises a substantially U-shaped channel 65 cut into the bottom of the housing 36. The sides of the channel comprise straight parallel walls 66 and 67 which terminate in circularly curved walls 68 and 69 respectively. The top surface of the channel is the flat surface 71 into which bore 36 opens, and the bottom surface of the channel comprises flat parallel surfaces 72 and 73. The lower flange of the channeled socket is formed with straight side walls 73' and 74 which merge into circularly curved walls 75 and 76 respectively. Preferably the bridge of the U-shaped socket is slotted as at 77 which enables the insertion of a tool should the button head become stuck to the coupling. Effectively slot 77 divides the socket structure into two similar oppositely facing legs 78 and 79.

The distance between channel side walls 66 and 67 equals the diameter of fitting head flange 24, and walls 68 and 69 have the same curvature as flange 24. The distance between walls 73' and 74 equals the diameter of the fitting at 26, and the curvature of walls 75 and 76 is the same as wall 26. The distance between surface 71 and the socket surfaces 72 and 73 equals the axial thickness of fitting flange 24. These parts are therefore so dimensioned that the coupling 20 through its bottom socket has an efficient sliding fit with fitting 21.

In attaching coupling 20 to fitting 21, the button head slides through the mouth of the socket with the flat top face 25 of the fitting sliding along surface 71. When coupling 20 is detached from the fitting, the valve element is spring urged to seat on valve seat 37 with the result that the lower end of boss 52 projects below surface 71. Consequently when the leading edge of face 25 reaches the center of the coupling it engages cam face 63 and cams the entire valve element 48 into the position shown in Figure 2, and when wall 26 of the fitting engages the socket walls 75 and 76 the face 64 on the valve element 48 surrounds the opening 29 of the fitting and is spring pressed against surface 71 to provide a tight leak-proof joint.

Thus attaching the coupling 20 to fitting 21 automatically moves the valve element 48 to open position so that lubricant introduced into chamber 35 under pressure through bore 38 may pass through chamber 35, ports 62 and bore 59 to open the fitting valve 31 by lubricant pressure.

The fitting valve 31 remains closed until lubricant pressure is developed so that the lubricant pressure does not interfere with the coupling attaching operation, and once the coupling is attached any increase in lubricant pressure in chamber 35 will aid spring 57 in holding the valve element 48 tight about fitting opening 29.

The force of spring 57 acting on the button head fitting through valve element 48 also serves to frictionally maintain coupling 20 and fitting 21 in attached relation.

The coupling of the invention has proved to be of particular utility in the lubrication of plug valves where lubricant pressures high enough to jack the plug from its seat are encountered particularly since the seal between the coupling and fitting is enhanced with increase of lubricant pressure. A plurality of different inlet bores are available for optimum attachment to a pump or gun conduit, and the coupling is light in weight, compact and inexpensive to manufacture.

Valves in the field are generally lubricated against considerable pressure depending upon the line pressure under which the valves are operating. It therefore becomes necessary to exert considerable pressure on the lubricant, by means of the lubricant gun, to insure proper lubrication or jacking of the valve plug. After the valve has received a sufficient charge of lubricant, the lubricant gun, coupling, fitting and their valves constitute a closed system and the lubricant in the coupling and gun are still under pressure when coupling is removed. If lubricant were free to flow through the coupling valve, considerable loss of lubricant would take place before the pressure in the coupling and gun were sufficiently relieved. This loss of lubricant is prevented by the present invention in that the valve 48 by immediately abutting against seat 37 immediately seals the chamber 35 thus preventing any flow of lubricant out of chamber 35 as soon as the coupling is removed from the valve fitting.

The valve 48 in our design serves two functions. When the button head of the fitting is inserted into the socket it displaces valve 48 against spring 57 and the fitting is spring held securely against the valve 48. This connection serves to provide a fluid tight engagement between the valve fitting and coupling thus preventing the escape of lubricant between the valve fitting and the coupling. In conventional prior designs, movement of the coupling valve to close when the coupling is removed from the valve fitting does not automatically seal the lubricant chamber of the coupling from the atmosphere. Flow of lubricant from the inside of the coupler therefore continues in such prior couplings until the internal pressure is relieved. However, in our design, on removal of the coupling from the valve fitting the chamber 35 is immediately sealed thus preventing any further flow of lubricant out of the coupling.

While this check valve feature on the present invention is useful when conventional lubricants are used, it is particularly useful when the compressible type of lubricant is being used since these compressible lubricants maintain pressure inherently and a considerable displacement of lubricant might be necessary before the pressure in the coupling is relieved. Since these lubricants are costly and in many installations a great number of valves must be periodically lubricated, this coupling effects considerable savings in reducing the loss of lubricants.

The invention may be embodied in other specific forms without departing from the spirit or essential characteristic thereof. The present embodiment is therefore to be considered in all respects as illustrative and not restrictive, the scope of the invention being indicated by the appended claims rather than by the foregoing description and all changes which come within the meaning and range of equivalency of the claims are intended to be embraced therein.

What is claimed and described to be secured by United States Letters Patent is:

1. In a lubricant coupling: a housing containing an annular internal chamber, means for introducing lubricant under pressure into said chamber and a smooth bore constant diameter outlet between said chamber and the outside of said housing coaxial with and of smaller cross-section than said chamber; a rigid one piece valve element including a seating portion disposed in said chamber and a boss smaller than said seating portion with a plurality of integral spaced annular guide flanges axially slidable and guidingly disposed in said bore; a threaded opening in the wall of said housing opposite said bore, large enough for insertion and removal of said valve element; a removable closure plug mounted in said threaded opening; a continuous valve seat in said chamber surrounding the inner end of said bore; a continuous annular face on said valve element seating portion adapted to engage said seat to prevent escape of lubricant into said bore; spring means compressed within said chamber normally urging said valve element to closed position with said face tight against said seat; an annular groove in said boss between said guide means and said seating portion; a recess in the end of the valve element opposite said spring means; a port in the valve element interconnecting said recess and said annular groove; a ring seal between spaced ones of said guide flanges disposed below said annular groove to maintain a fluid tight relationship between the relatively slidable boss and bore below said annular groove; a transverse slide guide socket on said housing adjacent the outer end of the boss for the slidable coupling attachment to an interfitting lubricant fitting; the outer end of said valve element boss projecting a small distance into said socket when the valve is closed so as to be positioned to be engaged and inwardly displaced to separate said valve seat and said valve element face to permit outward flow of lubricant from said chamber to said bore and compress said spring means when said lubricant fitting is attached to said socket; and said spring means serving also to tightly maintain said housing and lubricant fitting in operative attached assembly.

2. In the lubricant coupling defined in claim 1, said spring means comprising a coil spring compressed between the plug and the valve element body.

References Cited in the file of this patent

UNITED STATES PATENTS

| | | |
|---|---|---|
| 1,073,719 | Timmer | Sept. 23, 1913 |
| 2,450,461 | Wallach | Oct. 5, 1948 |
| 2,451,441 | Main | Oct. 12, 1948 |
| 2,557,807 | Wagner | June 19, 1951 |

FOREIGN PATENTS

| | | |
|---|---|---|
| 106,972 | Australia | Mar. 30, 1939 |
| 678,556 | Great Britain | Sept. 3, 1952 |